US009323082B2

(12) United States Patent
Tannas, Jr.

(10) Patent No.: US 9,323,082 B2
(45) Date of Patent: *Apr. 26, 2016

(54) APPARATUS AND METHODS FOR MOUNTING FLAT PANEL DISPLAYS

(76) Inventor: Lawrence E. Tannas, Jr., Orange, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 11/049,621

(22) Filed: Feb. 2, 2005

(65) Prior Publication Data

US 2006/0060732 A1 Mar. 23, 2006

Related U.S. Application Data

(60) Provisional application No. 60/541,148, filed on Feb. 2, 2004.

(51) Int. Cl.
*G12B 9/00* (2006.01)
*G02F 1/1333* (2006.01)
(Continued)

(52) U.S. Cl.
CPC .......... *G02F 1/133308* (2013.01); *B60K 35/00* (2013.01); *B60R 11/0235* (2013.01); *B64D 43/00* (2013.01); *G02F 1/1339* (2013.01); *H02G 3/123* (2013.01); *B60K 2350/405* (2013.01); *B60K 2350/941* (2013.01);
(Continued)

(58) Field of Classification Search
CPC .................. B60R 11/0235; B60R 2011/0005; B60K 35/00; B60K 2350/941; B60K 2350/943; G02F 1/133308; G02F 2001/133325; G02F 2001/133317; H02G 3/123
USPC ........ 248/205.1, 220.21, 27.1, 27.3; 362/559; 361/681, 679.02, 679.28; 349/153, 58, 349/187, 190; 345/905
See application file for complete search history.

(56) References Cited

U.S. PATENT DOCUMENTS 6,049,288 A * 4/2000 Kawasaki .............. B60K 37/00
248/27.1
6,119,060 A * 9/2000 Takayama .............. B60K 35/00
307/9.1
(Continued)

FOREIGN PATENT DOCUMENTS

GB 2238419 A 5/1991
JP 6214511 8/1994

OTHER PUBLICATIONS

"Flight assessment of 3 flat panel display technologies for CRT replacement" by Hitt, Proceedings of IEEE/AIAA 12th Digital Avionics Systems Conferenece, pp. 475-480, Oct. 1993.*
(Continued)

*Primary Examiner* — Todd M Epps
(74) *Attorney, Agent, or Firm* — William A. English; Vista IP Law Group LLP (57) ABSTRACT

An apparatus for mounting a flat panel display includes a bracket including fastener elements for mounting the bracket to a control panel having a panel opening therein, and a bezel for securing the display to the bracket such that the display covers the opening and the fasteners used to mount the bracket to the control panel. During use, the bracket is mounted to the control panel over the opening, and the display is secured to the bracket such that the display covers the opening and fasteners. The apparatus may be used for retrofitting an existing display with a flat panel display, with the existing display being removed before the bracket is mounted to the control panel.

27 Claims, 4 Drawing Sheets

(51) Int. Cl.
    *G02F 1/1339*      (2006.01)
    *H02G 3/12*      (2006.01)
    *B60K 35/00*      (2006.01)
    *B60R 11/02*      (2006.01)
    *B64D 43/00*      (2006.01)
    *B60R 11/00*      (2006.01)

(52) U.S. Cl.
    CPC ... *B60R 2011/0005* (2013.01); *B60Y 2304/076* (2013.01); *G02F 2001/133317* (2013.01); *G02F 2001/133325* (2013.01)

(56) References Cited

U.S. PATENT DOCUMENTS

| | | | |
|---|---|---|---|
| 6,163,452 A | 12/2000 | O'Neal et al. | |
| 6,172,869 B1 * | 1/2001 | Hood, III | G06F 1/1616 312/223.1 |
| 6,204,906 B1 * | 3/2001 | Tannas, Jr. | G02F 1/1339 349/153 |
| 6,380,999 B1 * | 4/2002 | Tannas, Jr. | G02F 1/1339 349/153 |
| 6,428,198 B1 * | 8/2002 | Saccomanno | G02B 6/0006 362/552 |
| 6,559,829 B1 * | 5/2003 | Matsuo | G09F 7/18 248/918 |
| 6,612,090 B1 * | 9/2003 | Corden | E04F 13/0803 52/235 |
| 6,633,276 B1 * | 10/2003 | Jaynes | F16M 11/08 248/923 |
| 6,742,776 B2 | 6/2004 | Monson et al. | |
| 6,905,101 B1 * | 6/2005 | Dittmer | F16M 11/04 248/125.7 |
| 7,246,785 B2 | 7/2007 | Monson et al. | |
| 7,337,566 B2 | 3/2008 | Inayoshi | |
| 7,473,931 B1 * | 1/2009 | Beseth | B64D 43/00 257/59 |
| 7,478,492 B2 | 1/2009 | Madonia | |
| 7,708,233 B2 * | 5/2010 | Tannas, Jr. | B60K 35/00 248/27.1 |
| 2002/0125401 A1 * | 9/2002 | Szumita et al. | 248/694 |
| 2003/0103042 A1 | 6/2003 | Moriyasu et al. | |
| 2005/0133677 A1 * | 6/2005 | Conerton | F16M 13/00 248/226.11 |
| 2007/0047193 A1 | 3/2007 | Smith | |
| 2007/0222705 A1 | 9/2007 | Gothard | |
| 2009/0159608 A1 | 6/2009 | Shoenfeld | |

OTHER PUBLICATIONS

Office Action for pending U.S. Appl. No. 11/752,273, dated Jul. 8, 2009, 9 pages.
U.S. Patent Office, Notice of Allowance for U.S. Appl. No. 11/752,273, CIP of present application: U.S. Appl. No. 11/049,621, Mailing Date: Dec. 23, 2009, 6 pgs.
English, William A., Amendment and USPTO Office Action for related U.S. Appl. No. 11/049,621, filed Aug. 9, 2012, 32 pages.
Hitt, "Flight assessment of 3 flat panel display technologies for CRT replacement," Proceedings of IEEE/AIAA 12th Digital Avionics Systems Conference, pp. 475-480, Oct. 1993.
Byrd, et al, "Interchangeable LCDs reduce cost and risk," Proceedings of SPIE, vol. 4362, pp. 144-151, 2001.
Orkis, "F-16 retrofit application using a modular avionics system architecture and color active matrix liquid crystal displays," Proceedings of SPIE, vol. 2219, pp. 178-188, 1994.
Hopper, et al, "Requirements for AMLCDs in U.S. Military Applications," Proceedings of SPIE, vol. 2462, pp. 130-141, 1995.
Hitt, "Retrofit of flat panel color displays in the F-16A/B," Proceedings of IEEE/AIAA 11th Digital Avionics Systems Conference, pp. 323-328, Oct. 1992.
English, William A., Amendments, Responses and USPTO Office Actions for related U.S. Appl. No. 12/773,687, Dated: Aug. 24, 2012 to Dec. 2, 2013, 95 pages.

\* cited by examiner

ABSTRACT AND METHODS FOR
MOUNTING FLAT PANEL DISPLAYS

RELATED APPLICATION DATA

This application claims benefit of provisional application Ser. No. 60/541,148, filed Feb. 2, 2004, the entire disclosure of which is expressly incorporated by reference herein.

FIELD OF THE INVENTION

The present invention relates generally to electronic displays for displaying information, and to apparatus and methods for mounting a display to a panel, such as a control panel within a cockpit of an aircraft, flight simulator, or work station.

BACKGROUND

Figure 1A:
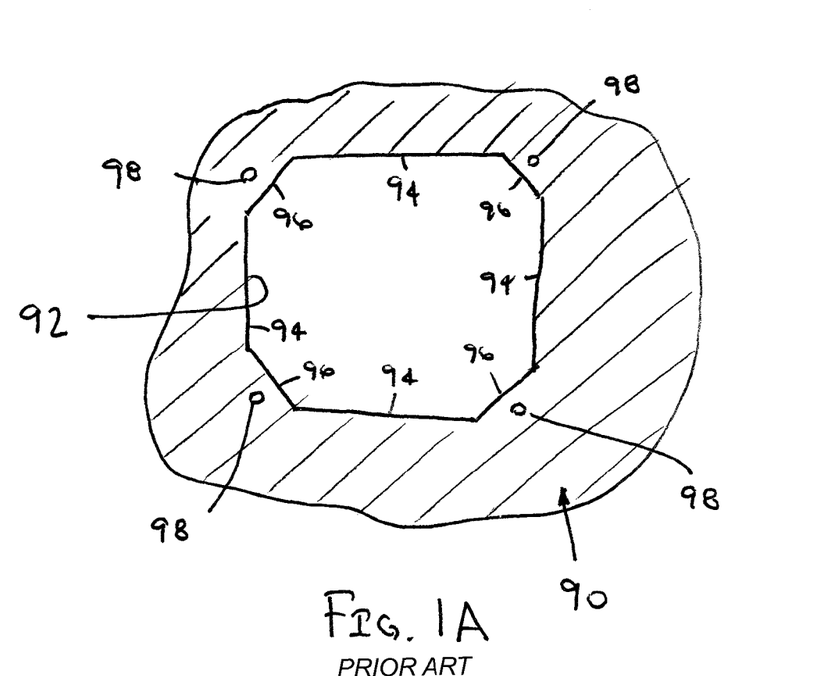
FIG. 1A is a plan view of a panel opening in a control panel.

Control panels, e.g., provided within a cockpit of an aircraft, include a plurality of panel openings for receiving instruments therein. FIG. 1A shows an exemplary panel opening 92 that may be provided in a control panel 90 and having an octagonal shape, e.g., a generally rectangular or square shape defined by vertical and horizontal sides 94 but with diagonal corners 96. Generally, holes 98 are provided adjacent the corners 96 for receiving screws or other fasteners therethrough.

Figure 1B:
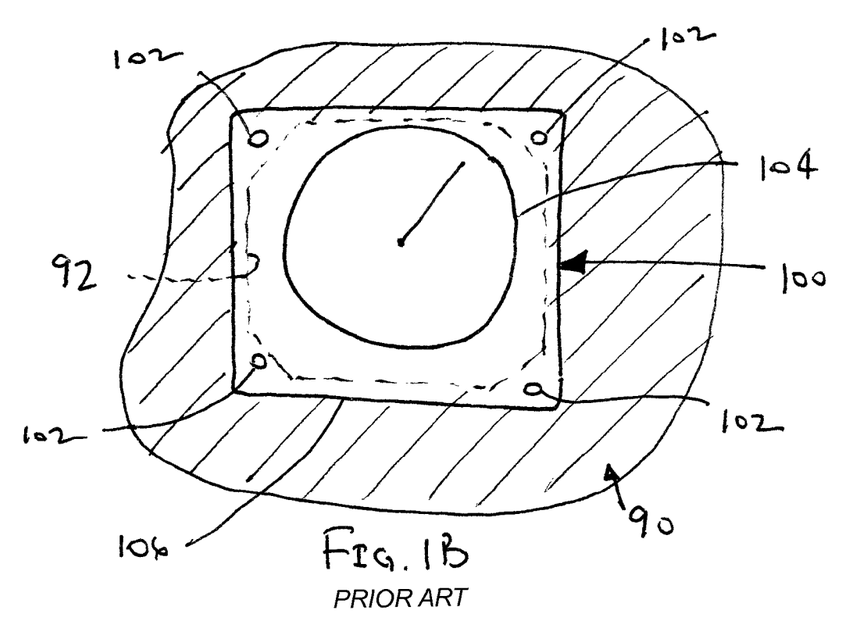
FIG. 1B is a plan view of an instrument received in the panel opening of the control panel of FIG. 1A.

Turning to FIG. 1B, an instrument 100 may be mounted in the panel opening 92, e.g., using screws 102 received through the holes 98 (not shown in FIG. 1B). As shown, the instrument 100 has a round dial 104 and a face plate 106 that abuts the control panel 90 when the instrument 100 is mounted.

Generally, instrument 100 may include a box (not shown) behind the dial 104 that extends through the panel opening 92 into the space behind the control panel 90. The box may include components for operating the instrument 100 and/or for receiving information and/or providing information to other parts of the aircraft. For example, the box may include a cathode ray tube ("CRT") that provides an image to the dial 104, electronic circuits, mechanical components, and the like.

More recently, flat panel displays ("FPDs") have been suggested to replace older instruments, such as CRTs or mechanical gauges. FPDs, however, may not be made economically with the four corners removed or rounded, e.g., due to the external circuits extending along at least two edges of the displays. Consequently, if a square or rectangular display is to be mounted within a panel opening, the display must be smaller than the panel opening, which may substantially reduce the active image area of the display available for displaying information.

Further, a box is generally required for carrying the electronics for operating a FPD or other display. The box may be mounted behind the control panel before the PFD is mounted over the panel opening. Once the box is mounted, however, it may be difficult to make any necessary connections between the box and the FPD and/or to secure the FPD to the control panel.

Accordingly, apparatus and methods for mounting a display to a control panel would be useful.

SUMMARY OF THE INVENTION

The present invention is directed generally to electronic displays, e.g., display heads including flat panel displays ("FPDs"), such as liquid crystal displays ("LCDs"), and more particularly to apparatus and methods for retrofitting or otherwise mounting a display to a control panel, such as a cockpit panel within an aircraft or other vehicle, a flight simulator, or a work station.

In accordance with one embodiment, an apparatus is provided for mounting a display, such as an LCD or other FPD, to a control panel having an opening therein. Generally, the apparatus includes a bracket including one or more fastener elements for mounting the bracket to the control panel over the opening. In exemplary embodiments, the fastener elements may include fasteners extending from the bracket, holes for receiving fasteners, clips, and the like. The fastener elements may be provided at predetermined locations on the bracket, e.g., such that the fastener elements may be aligned with the existing holes in the control panel adjacent the panel opening.

The apparatus may also include a bezel or frame for securing the display to the bracket such that the display at least partially covers the panel opening. For example, the display may have dimensions larger than the panel opening such that the display covers both the panel opening and any fasteners or holes adjacent the panel opening. In an exemplary embodiment, the bezel and bracket are pivotally attached to one another, e.g., along one edge of the bezel and bracket. Optionally, the bezel and/or bracket may include interlocking elements, a latch, or other lock for securing the bezel against the bracket, e.g., such that the bezel and bracket lie substantially parallel to one another and/or to the control panel. Thus, the apparatus may minimize a profile of the display, e.g., how far the display protrudes from the surface of the control panel, while maximizing the available image area of the display given the limited size of an existing panel opening in a control panel.

Optionally, the apparatus may also include a box mountable to the control panel behind the panel opening, which may include electrical circuits for operating the display, one or more ribbon connectors or other cables for coupling the electrical circuits to the display, switches, and the like. In addition or alternatively, the apparatus may include a backlight for delivering light to a back surface of the display, e.g., mounted directly to the display or provided in the box.

In accordance with another embodiment, a method is provided for mounting a display to a control panel having a panel opening therein. A bracket may be mounted to the control panel over the panel opening, e.g., using one or more fasteners received in one or more corresponding holes in the control panel adjacent the panel opening. A display, e.g., an FPD, may be secured to the bracket, the display having a size larger than the panel opening. Thus, the display may at least partially cover the panel opening and/or the one or more fasteners used to mount the bracket to the control panel.

In one embodiment, the display may be received within or against a bezel. Optionally, the bezel may be pivotally mounted to the bracket, e.g., before or after placing the display in the bezel. For example, the bezel may be pivotally and/or removably attached to the bracket by a hinge along one edge. The bezel may be pivoted away from the control panel, thereby providing access through an opening in the bracket into the space behind the control panel. A box, e.g., including electronics for operating the display, may be mounted to the back of the control panel behind the panel opening, which may be accessed through the bracket opening and panel opening.

The display may be inserted in or otherwise secured to the bezel, and any cables, e.g., ribbon connectors, and the like, may be connected between the box and the display. Optionally, any switches, shafts for control knobs, and the like may also be connected to the display. The bezel may be closed over the panel opening, and locked relative to the bracket, thereby securing the display substantially against or adjacent the control panel.

In yet another embodiment, a method is provided for retrofitting an existing display mounted to a control panel over a panel opening. The existing display may be removed from the panel, and a bracket may be mounted to the control panel at least partially over the panel opening. A flat panel display may be secured to the bracket such that the display at least partially overlies the panel opening, the flat panel display having a size larger than the panel opening.

In still another embodiment, a method is provided for mounting a flat panel display to a control panel having one or more holes therein. A bracket is mounted to the control panel using the one or more holes, the display is electrically coupled to display electronics through the one or more holes, and the display is secured to the bracket such that the display overlies the one or more holes.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE PREFERRED EMBODIMENTS

Figures 2, 2A:
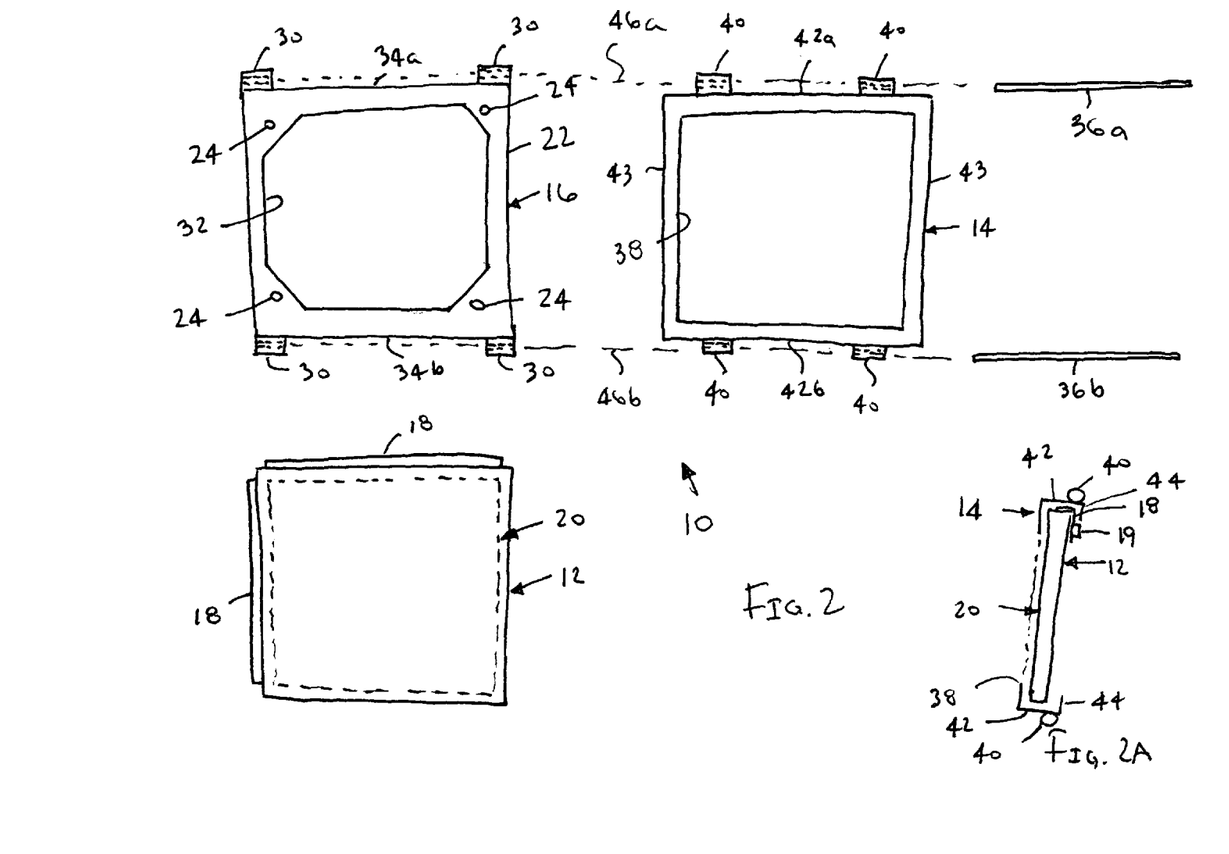
FIG. 2 is an exploded perspective view of an exemplary electronic display apparatus, including a flat panel display, a bezel for receiving the display, and a bracket for mounting the bezel and/or display to a control panel.
FIG. 2A is a side view of the bezel of FIG. 2 with the display received therein.

Turning to the drawings, FIG. 2 shows an exemplary embodiment of an apparatus 10 that generally includes a flat panel display ("FPD") 12, a bezel or other frame 14 for receiving the display 12, and a bracket 16 for mounting the bezel 14 and/or display 12 to a control panel, such as the control panel 90 shown in FIG. 1A.

The display 12 may be a liquid crystal display ("LCD"), such as an active matrix liquid crystal display ("AMLCD") including front and back plates. It will be appreciated that the display 12 may include other types of electronic displays, such as plasma displays, liquid crystal on silicon ("LCON") displays, and the like. The display 12 may have a rectangular, square, or other size and/or shape, which may be larger than a cross-section of the panel opening 92 in the control panel 90, as explained further below. Optionally, the display 12 may be a resized display, i.e., a rectangular display that has been cut and resealed into a smaller configuration, e.g., a square or other configuration. Exemplary displays that may be used and methods for making them are disclosed in U.S. Pat. No. 6,204,906, in co-pending application Ser. No. 60/573,4211, filed May 21, 2004, and international application PCT/US2004/028563, filed Sep. 1, 2004. The entire disclosures of these references and any others cited therein are expressly incorporated by reference herein.

The display 12 may include one or more external circuits 18, e.g., TABs, COGs, driver circuits, and the like, extending along one or more edges of the FPD 12. In an exemplary embodiment, the circuits 18 may extend from a top edge and a side edge of the display 12 around onto a back surface of the display 12, similar to FPDs used for laptop computers and other devices where it is desirable to minimize components extending outwardly from the top and/or side edges of the display 12. One or both circuits 18 may include a connector 19 (see FIG. 2A), which may be used to couple the circuits to electrical circuits (not shown) for operating the display 12. Optionally, the display 12 may include other components, such as one or more polarizer films, filters, image enhancement films, and/or viewing angle enhancement films on front and/or back surfaces of the display 12, e.g., overlying an active image area 20 of the display 12.

With continued reference to FIGS. 1A and 2, the bracket 16 generally includes a planar member 22 including a plurality of fastener elements 24 for mounting the bracket 16 to the control panel 90, and a plurality of interlocking elements 30 for attaching or otherwise securing the bezel 14 relative to the bracket 16. Optionally, the bracket 16 may include one or more openings therethrough, such as bracket opening 32. The bracket opening 32 may correspond in size and/or shape to the panel opening 92 or may be smaller or larger than the panel opening 92, e.g., to accommodate connecting components to the display 12. The planar member 22 may have a rectangular or square periphery, as shown, although alternatively, the planar member 22 may have an elliptical or round shape, if desired based upon the available space on the control panel 90.

As shown in FIG. 2, the fastener elements 24 are holes for receiving fasteners therethrough, e.g., screws, rivets, bolts, pins, and the like (not shown). Alternatively, the fastener elements 24 may include fasteners, e.g., screws, bolts, clips, and the like, extending from the planar member 22 (not shown). The fasteners may be welded, bonded, or otherwise substantially permanently attached to the planar member 22, e.g., such that the fasteners extend substantially perpendicularly from a back surface of the planar member. Alternatively, the fasteners may be inserted through holes provided in the planar member 22 and attached thereto. In a further alternative, other fastener elements (not shown) may be used for mounting the bracket 16 to the control panel 90.

The fastener elements 24 may be distributed about a periphery of the planar member 22 in a desired pattern, e.g., corresponding to the existing pattern of holes 98 adjacent the panel opening 92 in the control panel 90 to which the bracket 16 is to be mounted. Although four fastener elements 24 are shown, it will be appreciated that fewer or additional fastener elements 24 may be provided, e.g., two, three, or more on the bracket 16, if desired or the existing control panel dictates.

As shown in FIG. 2, the interlocking elements 30 may include a plurality of sockets for receiving pins 36 therein. In one embodiment, the interlocking elements 30 may be formed by providing one or more tabs or other extensions from one or more edges 34 of the planar member 22 that are rolled to at least partially define a channel. Alternatively, the interlocking elements 30 may be separate tubular sections attached along the edges 34 of the bracket 16, e.g., by welding, bonding with an adhesive, using connectors, and the like. The interlocking elements 30 may define a substantially cylindrical channel, or other channel shape corresponding to a cross-section of the pins 36.

The bracket 16 may be formed from a flat sheet of material, e.g., a relatively thin sheet of metal, such as aluminum or stainless steel, a plastic, or a composite material. The flat sheet may be cut into the shape of the planar member 22 with extensions to accommodate interlocking elements 30 along opposite edges 34. The bracket opening 32, holes 24, and/or other openings (not shown) may be cut or otherwise formed in the planar member 22, and the extensions may be formed, e.g., by roll-forming, breaking, or otherwise transforming the extensions into the interlocking elements 30. Alternatively, all or a portion of the bracket 16 may be machined, cast, injection molded, and the like.

If the interlocking elements 30 are provided from separate tubular sections, the tubular sections may be cut or otherwise formed from a long section of tubing cut into individual tubular sections, and attached to the planar member 22. The interlocking elements 30 may be substantially flush relative to a back surface of the bracket 16, e.g., such that the bracket 16 may be placed directly against a control panel or other surface without the interlocking elements 30 interfering. Thus, the interlocking elements 30 may protrude slightly from a front surface of the bracket 16 or alternatively may be substantially flush with the front surface of the bracket 16.

With continued reference to FIG. 2 and additional reference to FIG. 2A, the bezel 14 may also be a generally planar member including a frame or border generally defining a rectangular or square shape. The bezel 14 may include an opening 38 therein, e.g., to allow an active imaging area 20 of the display 12 to be seen therethrough, as explained further below. The bezel 14 may include one or more interlocking elements 40 extending along edges 42 of the bezel 14, which may be formed similar to the interlocking elements 30 on the bracket 16. Optionally, the bezel 14 may include one or more switches, dials, or other components (not shown) useful for operating the display 12 received therein.

The bezel 14 may also include one or more side portions, e.g., defining a groove or pocket for receiving the display 12 therein. For example, as shown in FIG. 2A, the bezel 14 may include flanges 44 extending along opposite upper and lower edges 42 of the bezel 14, thereby defining grooves into which the display 12 may be slid from one end of the bezel 14. Optionally, the bezel 14 may include flanges (not shown) on one or both side edges 43, which may limit insertion of the display 12. For example, a transverse flange may be provided on one end, and a planar flange may be provided on the other end that may be directed from a planar to a transverse orientation after the display 12 is inserted between the flanges 44, e.g., to secure the display 12 to the bezel 14. Alternatively, the bezel 14 may include clips, fasteners, or other elements (not shown) for securing the display 12 to the bezel 14, e.g., such that the active image area 20 of the display 12 is visible through the opening 38.

Similar to the bracket 16, the bezel 14 may be formed from metal, plastic, or composite materials, e.g., that may be broken or otherwise formed from a flat sheet, cast, injection molded, and the like. As shown in FIG. 2, the bezel 14 may have an outer perimeter similar in size to the bracket 16. Alternatively, the bezel 14 may be larger than the bracket 16, yet may be secured relative to the bracket 16, e.g., by the interlocking elements 30, 40. Optionally, the bezel 14 (or other components of the apparatus 10) may include one or more environmental seals and/or shielding for protecting the display 14 or otherwise ruggedizing the display 12.

The bezel 14 may be secured to the bracket 16, e.g., using one or more pins 36. The bezel 14 may be placed over the bracket 16 such that the interlocking elements 40, 30 along corresponding edges 42a, 34a are aligned with one another, as exemplified by the dashed line 46a in FIG. 2. The interlocking elements 40 on the bezel 14 may be offset along the edges 42 as compared to the interlocking elements 30 on the bracket 16 such that the interlocking elements 30, 40 may be disposed adjacent one another when the bezel 14 is properly aligned with the bracket 16.

The pin(s) 36a may then be inserted through the interlocking elements 30, 40, thereby securing the bezel 14 to the bracket 16. With only one pin 36a inserted through the interlocking elements 30, 40, the bezel 14 may be pivotally secured to the bracket 16 along edges 42a, 34a. Thus, the bezel 14 may be pivotally movable between a closed position (such as that shown in FIG. 4), wherein the bezel 14 overlies the bracket 16, and an open position (such as that shown in FIG. 3), wherein the bezel 14 is disposed away from the bracket 16, exposing the bracket opening 32. In alternative embodiments, alternative hinge structures may be provided to pivotally secure the bezel 14 relative to the bracket 16.

With the bezel 14 moved into the closed position, the bezel 14 may substantially cover the bracket opening 32 and the fastener elements 24 (or fasteners, not shown, received through the fastener elements 24). In this position, the interlocking elements 40, 30 on the opposite side edges 42b, 34b may be aligned with one another, as exemplified by dashed line 46b. Pin(s) 36b may then be inserted through the interlocking elements 30, 40, thereby preventing the bezel 14 from subsequently moving relative to the bracket 16. If the display 12 is received in or otherwise secured to the bezel 14, the display 12 may consequently be secured relative to the bracket 16 when the bezel 14 is secured to the bracket 16.

Optionally, to avoid the bezel 14 from subsequently separating from the bracket 16, the pins 36 may be secured relative to the interlocking elements 30, 40. For example, one or more of the interlocking elements 30, 40 may be crimped down on each pin 36, thereby preventing the pins 36 from being unintentionally removed. Alternatively, one or more ends of the pins 36 may be bent to prevent their subsequent removal, or set screws (not shown) may be provided that may be tightened down on the pins 36 to prevent their removal.

In addition or alternatively, the pins 36 may be attached to one or more of the interlocking elements 30, 40, e.g., using an adhesive, by welding, and the like. Alternatively, one of the interlocking elements 30, 40 may include a pin (rather than a socket), and the adjacent interlocking elements 40, 30 may include a socket for receiving the pin. In a further alternative, instead of interlocking elements 30, 40 along side edges 34b, 42b and pin 36b, a latch, screws, or other locking mechanism (not shown) may be provided to secure the bezel 14 pivotally and/or fixedly to the bracket 16.

Figure 3:
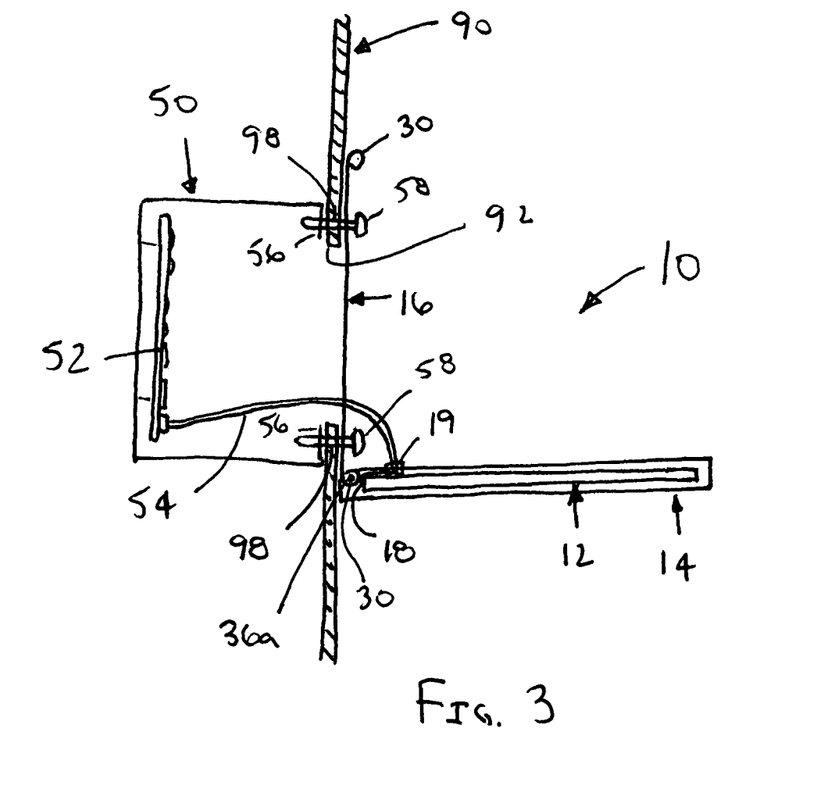
FIGS. 3 and 4 are cross-sectional side views of a control panel, showing a method for mounting a flat panel display to the control panel over a panel opening therein.

Turning to FIG. 3, optionally, the apparatus 10 may also include a box 50, which may include electrical circuits 52 for operating the display 12. One or more cables 54 may be provided for coupling the electrical circuits 52 to the display 12, e.g., via connector 19. The box 50 may include any package for carrying and/or enclosing the electrical circuits 52, as is well known in the art. Optionally, the box 50 may include one or more flanges 56 for mounting the box 50 to the control panel 90, e.g., to the back of the control panel 90 behind the panel opening 92. In one embodiment, the flanges 56 may include holes (not shown) for receiving fasteners 58 therethrough. The fasteners 58 may also be used for mounting the bracket 16 to the control panel 90 or separate fasteners (not shown) may be used. Alternatively, the box 50 may be inserted through the panel opening 92 from the front of the control panel 90. In this alternative, the box 50 may include outward oriented flanges or other elements (not shown) that may prevent the box 50 from passing entirely through the panel opening 92.

In addition or alternatively, a clamp apparatus (not shown) may be used for mounting the box 50 to the control panel 90.

The clamp apparatus may include one or clamp members that may be received around the box 50 adjacent the control panel 90. The clamp members may include lips or other elements for securing the clamp to the back of the control panel 90, e.g., using one or more fasteners (also not shown).

In yet another option, the apparatus 10 may include a backlight (not shown) for delivering light through the display 12. In one embodiment, the backlight may be mounted directly to the back of the display 12. In this embodiment, the bezel 14 and/or bracket 16 may be configured to accommodate the backlight, which may extend inwardly partially through the panel opening 92 from the display 12. In an alternative embodiment, the backlight may be provided in the box 50, e.g., adjacent the control panel 90, and the backlight may be optically coupled to the display 12, e.g., by one or more lenses and the like (also not shown). For example, the backlight may include a parabolic member for directing light from a point source towards the backplane of the display 12. Alternatively, a flat backlight may be mounted to the box that is disposed substantially parallel to the display 12 for delivering light to the backplane of the display 12.

Figure 4:
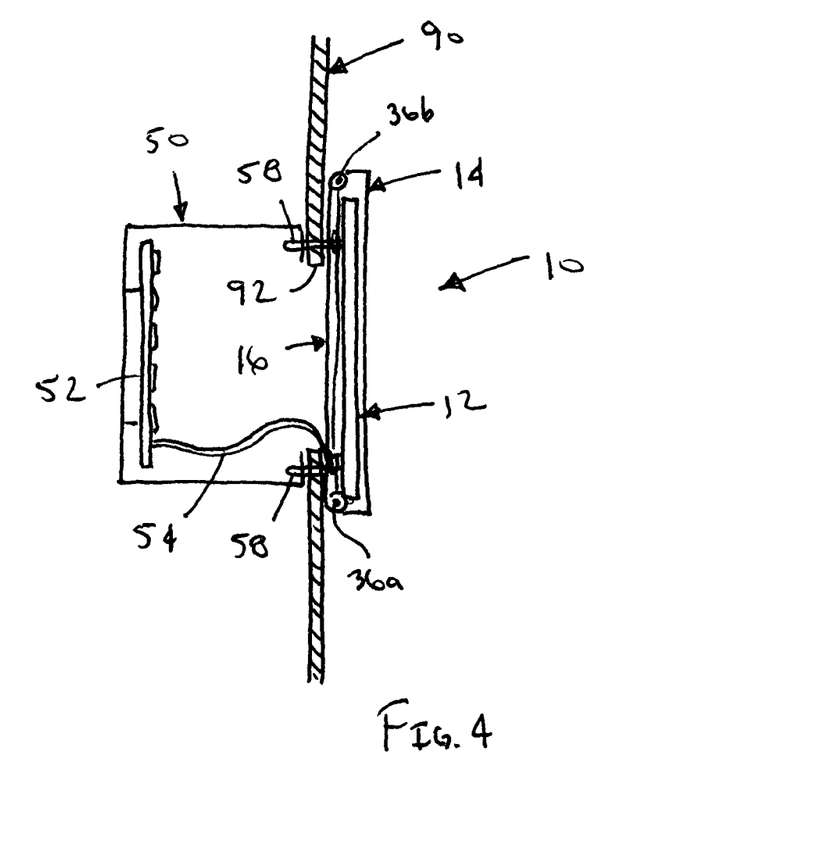

Turning to FIGS. 3 and 4, a method is shown for mounting a flat panel display 12 to a control panel 90, e.g., using any of the apparatus 10 described herein. The control panel 90 may be located within a cockpit of an aircraft, or on the dashboard of another vehicle. Alternatively, the control panel 90 may be part of a flight simulator or a work station (not shown).

The apparatus 10 may be used to retrofit or replace an existing display (not shown) with the display 12. For example, as shown in FIG. 1B, an instrument 100 may already be mounted to the control panel 90 through the panel opening 92. The instrument 100 may include a CRT or gauge that has discontinued to function or is simply being upgraded to an LCD or other FPD. The instrument 100 may be removed from the control panel 90, e.g., by removing fasteners 102 and then pulling the instrument 100 out of the panel opening 92 and away from the control panel 90. Pulling the instrument 100 may also require disconnecting or severing cables or mechanical connectors (not shown) that are coupled to the instrument 100.

Turning to FIG. 3, box 50 may be placed behind the panel opening 92 and/or secured to the control panel 90. For example, the box 50 may be inserted at least partially through the panel opening 92 and may be secured to the control panel 90 by one or more fasteners, a clamp apparatus, and the like.

The bracket 16 may be mounted to the control panel 90 adjacent and/or over the panel opening 92. For example, fasteners 58 may be directed through holes 24, 98 in the bracket 16 and control panel 90 to substantially secure the bracket 16 against the control panel 90. The same fasteners 58 may be used to mount the box 50 or separate fasteners may be used.

The display 12 may then be secured to the bracket 16, e.g. such that the display 12 overlies the panel opening 92. For example, as shown in FIG. 3, the bezel 14 may be pivotally secured to bracket 16 by a pin 36a, which may be received through interlocking elements 30, 40 (not shown, see FIG. 2), as described previously. Optionally, the pin 36a may be secured to one or more of the interlocking elements 30, 40, e.g., by clamping down on the interlocking element(s) 30, 40, thereby creating an interference fit that prevents the pin 36a from being removed subsequently.

With the bezel 14 pivotally secured to the bracket 16, the bezel 14 may be moved to the open position shown in FIG. 3, and the display 12 may be secured to the bezel 14. For example, as described previously, the display 12 may be slid between flanges 44 on the back of the bezel 14, as shown in FIG. 2A. Although the bezel 14 is shown pivoting horizontally, it will be appreciated that the interlocking elements 30, 40 or other hinge structure may be provided on the top or bottom edges of the bezel 14 and bracket 16, if desired.

One or more cables, e.g., ribbon connector 54, may be connected between the box 50 and the display 12 to couple the electrical circuits 52 in the box 50 to the circuits 18 on the display 12. The cable(s) may be directed through the bracket opening 32 in the bracket 16 (not shown, see FIG. 2).

If a backlight is provided within the box 50 or on the back of the display 12, the backlight may be coupled to the display 12, if necessary. In addition or alternatively, if the display 12 requires one or more switches, dials, or other mechanical connections, e.g., provided on the bezel 14 or the display 12, the connection(s) may be coupled through the panel opening 92, e.g., to the box 50 or other component(s) behind the control panel 90.

With the display 12 connected to any necessary components through the bracket opening 32, the bezel 14 may be directed to the closed position, as shown in FIG. 4. Pin 36b may be inserted through the interlocking elements 30, 40, thereby securing the bezel 14, and consequently, the display 12 relative to the control panel 90.

As shown, the display 12, bezel 14, and bracket 16 may all lie substantially flat, e.g., substantially parallel to the control panel 90 when the display 12 and bezel 14 are secured to the bracket 16. In an exemplary embodiment, the display 12 and bezel 14 may project a relatively small distance above the surface of the control panel 90 in the final installation. With the display 14 being a FPD, the profile of the installation may be substantially minimized. For example, the display 12 may extend not more than about thirty millimeters (30 mm) or even less than about ten millimeters (10 mm) above the control panel 90 when the display 12 is secured to the control panel 90.

As shown in FIG. 4, the display 12 may cover the fasteners 58 used to mount the bracket 16 to the control panel 90. Thus, the display 12 may substantially cover the bracket 16, e.g., particularly the bracket opening 32. Consequently, the display 12 may also substantially cover the panel opening 92 behind the bracket 16. Because of this configuration, the size of the display 12 is not limited by the size of the panel opening 92 as was the old instrument 100 received through the panel opening 92.

Thus, a display 12 that has a size larger than the maximum cross-sectional dimension of the panel opening 92 may be secured to the control panel 90, thereby maximizing the active image area that may be used to provide information. The size of the display 12 may consequently be dictated, not by the size of the panel opening 92, but by the proximity of the display 12 to other displays or instruments mounted to the control panel 90 near the panel opening 92. For example, if the panel opening 92 had a width W1 and height H1 of two inches (50 mm) by two inches (50 mm), it may be possible to mount a display 12 having a width W2 and a height H2 of three inches (75 mm) by three inches (75 mm) over the panel opening 92, thereby allowing the size of the display 12 to be increased beyond the limitations of the size of the panel opening 92.

Another advantage of the apparatus 10 described herein is that it may reduce the cost to repair or replace the display 10 after installation. For example, with prepackaged instruments, if the instrument fails, the entire instrument is generally replaced. With the apparatus 10, it may only be necessary to repair or replace one or more components of the apparatus 10 after installation. For example, if the display 12 fails to operate after installation, the display 12 and/or box 50 may be tested. If only one of the display 12 and box 50 need repair or replacement, the other components may remain in place.

To access the box 50 or remove the display 60, one of the pins 36 may be removed, the bezel 14 opened, and any cables 46 disconnected through the panel opening 92. If the display 12 needs to be replaced, the box 50, bezel, and bracket 16 may remain. The old display 12 may simply be removed from the bezel 14, and a new display 12 inserted back into the bezel 14, which may then be closed and secured to the bracket 16 by pin 36 (which may be the same pin or a new pin). If the box 50 needs repair or replacement; it may be possible to leave the display 12, bezel 14, and bracket 16 in place while the box 50 is repaired or replaced.

Further, the interchangeability of the apparatus 10 may allow different size displays 12 and bezels 14 to be secured to a single bracket 16 and/or coupled to a single box 50. Thus, the apparatus 10 may improve the overall versatility of the display 12 or other different size or configuration displays (not shown). Further different boxes may be provided that drive or otherwise operate an individual display 12 to display different information, e.g., to provide an altimeter, an airspeed indicator, a horizontal situation display, engine instrument, and the like based upon the inputs provided by the selected box.

It will be appreciated that elements or components shown with any embodiment herein are exemplary for the specific embodiment and may be used on or in combination with other embodiments disclosed herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for mounting a flat panel display to a control panel within a cockpit of an aircraft, flight simulator, or work station, the control panel having a panel opening therein having a cross-section sized for mounting a display therein, comprising:
    mounting a bracket to a substantially flat outer surface of the control panel adjacent the panel opening such that a rear surface of the bracket overlies the outer surface of the control panel; and
    after mounting the bracket, securing a flat panel display to the bracket such that a back surface of the display overlies the outer surface of the panel opening such that the flat panel display is immovable relative to the control panel during operation and does not extend into the panel opening, the flat panel display having a size larger than the cross-section of the panel opening such that outer edges of the flat panel display overlap regions of the control panel surrounding the panel opening.

2. The method of claim 1, further comprising removing an existing display from the panel opening, wherein the existing display comprises at least one of a cathode ray tube, a galvanometric gauge, and a mechanical gauge.

3. The method of claim 1, wherein securing a flat panel display to the bracket comprises securing the display to the bracket by a bezel such that the display overlies the panel opening.

4. The method of claim 1, wherein the display and the bracket are substantially flat and wherein securing a flat panel display to the bracket comprises securing the display to the bracket such that the display lies substantially parallel to the control panel.

5. The method of claim 4, wherein securing a flat panel display to the bracket comprises securing the display to the bracket such that the display extends not more than about thirty millimeters above the control panel when the display lies substantially parallel to the control panel.

6. The method of claim 1, the control panel comprising a plurality of holes adjacent the panel opening, and wherein mounting a bracket to the control panel comprises mounting the bracket to the control panel by receiving a plurality of fasteners through the holes.

7. The method of claim 6, wherein securing a flat panel display to the bracket comprises securing the display to the bracket such that the display covers the holes and fasteners.

8. The method of claim 1, wherein securing a flat panel display to the bracket comprises securing the display such that the display overlies the panel opening and a backlight mounted to the display extends through the panel opening and is located behind the control panel.

9. The method of claim 1, wherein securing a flat panel display to the bracket comprises securing the display to the control panel such that the display extends not more than ten millimeters above the control panel.

10. The method of claim 1, wherein the flat panel display includes a backlight mounted directly to the display, and wherein securing the flat panel display comprises securing the flat panel display such that the backlight is disposed in front of the outer surface of the control panel once the flat panel display is secured to the control panel.

11. The method of claim 1, wherein securing a flat panel display to the bracket comprises securing the flat panel display to the bracket using a bezel, the bezel having an opening through which an active image area of the display is visible.

12. A method for mounting a flat panel display to a control panel within an aircraft having a substantially flat outer surface with a panel opening therein, the panel opening having a width W1 and a height H1, comprising:
    providing a flat panel display comprising front and back plates having a width W2 and a height H2, width W2 being greater than width W1 and height H2 being greater than H1; and
    securing the flat panel display to the outer surface of the control panel such that the display does not extend into the panel opening and a back surface of the display overlies the outer surface of the control panel and a front surface of the display is spaced further from the outer surface than the rear surface.

13. The method of claim 12, wherein securing the flat panel display to the outer surface of the control panel comprises:
    mounting a bracket to the outer surface of the control panel adjacent the panel opening; and
    securing the display to the bracket.

14. The method of claim 13, wherein mounting the bracket comprises delivering a plurality of fasteners through respective holes in the bracket and the control panel adjacent the panel opening, and wherein the display covers the holes and fasteners when the display is secured to the bracket.

15. The method of claim 13, wherein securing the flat panel display to the bracket comprises securing the flat panel display to the bracket using a bezel, the bezel having an opening through which an active image area of the display is visible.

16. The method of claim 13, wherein securing the flat panel display to the bracket comprises:

securing the flat panel display to a bezel, the bezel having an opening through which an active image area of the display is visible; and after securing the flat panel display to the bezel, securing the bezel to the bracket, thereby securing the flat panel display relative to the control panel.

17. The method of claim 12, further comprising securing a box to the control panel such that the box is behind the panel opening, the box comprising electrical circuits for operating the display.

18. The method of claim 17, wherein securing the box to the control panel comprises mounting one or more flanges on the box to the back of the control panel.

19. The method of claim 17, wherein the box comprises outward oriented flanges and wherein securing the box comprises inserting the box through the panel opening from the front of the control panel, the flanges preventing the box from passing entirely through the panel opening.

20. The method of claim 19, wherein the box is secured to the control panel by one or more fasteners.

21. The method of claim 19, wherein the flat panel display is secured to the outer surface of the control panel after inserting the box through the panel opening.

22. The method of claim 19, wherein:

the box is inserted through the panel opening before securing the flat panel display to the outer surface of the control panel; and securing the flat panel display to the outer surface of the control panel comprises mounting a bracket to the outer surface of the control panel adjacent the panel opening; and securing the display to the bracket.

23. The method of claim 12, further comprising removing an existing display from the panel opening before securing the flat panel display to the outer surface of the control panel, the existing display having a size smaller than the width W1 and height H1 of the panel opening.

24. The method of claim 12, further comprising securing a box to the control panel such that the box is behind the panel opening, the box comprising a backlight optically coupled to the display.

25. The method of claim 12, wherein securing the flat panel display comprises securing the display such that the flat panel display overlies the panel opening and a backlight mounted to the display extends through the panel opening and is located behind the control panel.

26. The method of claim 12, wherein the flat panel display includes a backlight mounted directly to the display and wherein securing the flat panel display comprises securing the flat panel display such that the backlight is disposed in front of the outer surface of the control panel once the flat panel display is secured to the control panel.

27. The method of claim 12, wherein securing the flat panel display comprises securing the display such that the front surface of the display extends not more than about thirty millimeters above the control panel.

* * * * *